United States Patent Office 2,983,581
Patented May 9, 1961

2,983,581
PREPARATION OF DECABORANE

William De Acetis, Niagara Falls, and Samuel I. Trotz, Buffalo, N.Y., assignors, by mesne assignments, to Olin Mathieson Chemical Corporation, a corporation of Virginia No Drawing. Filed Dec. 5, 1956, Ser. No. 626,548

2 Claims. (Cl. 23—204)

This invention relates to the preparation of decaborane and, more in particular, provides a method for the production of decaborane from the controlled pyrolysis of diborane in the presence of a Lewis base, that is, a compound having available an unshared pair of electrons. Also, according to this invention decaborane can be produced by the controlled pyrolysis of diborane in the presence of a Lewis base and pentaborane (9).

Decaborane is a stable, white crystalline material with a melting point of 99.5° C. Its boiling point is 213° C. at atmospheric pressure and its density is 0.94 g. per cc. at 25° C. The vapor pressure of this compound at 100° C. is 19.0 mm. of mercury. Decaborane is a boron hydride of very high boron content and has a very high heat of combustion, indicating its utility as a high energy fuel. It is an extremely valuable material for the preparation of liquid fuels. Methods for the preparation and utilization of such liquid fuels is described in Altwicker, Garrett, Harris and Weilmuenster application, Serial No. 497,407, filed March 28, 1955.

A great number of processes for the production of decaborane from diborane have been proposed. In the majority of these processes, it has been proposed to produce decaborane by the thermal treatment of, or pyrolysis of, diborane at substantially atmospheric pressure. The conversion of diborane to decaborane at moderately elevated temperatures, at which temperature most of the volatile boranes will undergo polymerization to form boranes of higher molecular weight, appears to be quite complex and the reaction mechanisms still are not completely understood. In carrying out a process for the production of decaborane involving the pyrolysis of diborane at moderate temperatures, a complete range of boron hydrides, including the higher molecular weight solid products, is produced. A major disadvantage of the processes proposed previously is that the production of high molecular weight solid boron hydrides which invariably accompanies the formation of decaborane in such processes represents a loss of valuable diborane from the process and a consequent reduction in yield of the desired decaborane. These solid products are extremely inert and at the present state of the art there is no very satisfactory method for converting them into useful materials.

There is need in the art, therefore, for a process to produce decaborane which greatly reduces the formation of undesirable solid products with the consequent reduction in yield and which gives high conversion of the starting boron hydride diborane to the desired decaborane.

By the process of this invention diborane can be converted to decaborane by pyrolysis of the diborane at moderate temperatures in the presence of a Lewis base such as dimethylether to give high yields of decaborane. In addition, the presence of a small amount of pentaborane (9) e.g., about 5 to 25 mole percent of pentaborane (9), based on the moles of diborane, will increase the conversion and the yield of decaborane in this reaction. With this process the production of undesirable solid boron hydrides is reduced to a minimum.

The following examples illustrate various embodiments falling within the scope of this invention and are to be considered as not limitative.

Example I

This experiment was conducted in a one liter bulb as the reactor. The neck of this bulb was 75 mm. in length and 38 mm. in diameter and was surrounded by a water condenser of approximately 48 mm. in diameter and extending the full length. This reactor was attached to a manifold constructed of 2 mm. bore capillary tubing. The manifold had two inlets for the admission to gaseous reactants of the reactor bulb, a connection to a vacuum line and a connection to a U-tube mercury manometer.

The apparatus was fully evacuated, then filled with gaseous dimethylether until the absolute pressure in the bulb was 50 mm. of mercury and thereafter gaseous diborane was introduced until the absolute pressure in the bulb was 538 mm. of mercury. The absolute amount of diborane introduced was determined by weighing the cylinder source before and after use.

Tap water was then passed through the condenser and the reactor was immersed in an oil bath maintained at 150° C. for a period of 10 minutes. The quantities of reactants were such that at the temperature of the oil bath (150° C.) the expanded vapors exerted approximately one atmosphere of pressure. During the progress of the reaction, the decaborane collected in the neck of the flask while the pressure rose to somewhat less than two atmospheres. At the end of the heating period the reactor was removed from the oil bath and quickly cooled by spraying with acetone. At this point the decaborane was almost entirely within the neck of the flask and a thin film of yellow boron polymers was evident on the bottom surface of the reactor.

The volatile material in the bulb was transferred under vacuum and condensed into a trap maintained at —196° C. connected to the vacuum line. The condensate was fractionally condensed from the main trap into three portions; the first condensing at —78° C., the second at —130° C. and the third at —196° C. The combined fractions in the —78° C. trap and the —130° C. trap were allowed to expand into a known volume and the pressure reported. The fraction in the —196° C. trap was likewise permitted to expand into a known volume and the pressure noted. Gas samples from each of the expanded fractions were submitted for infrared analysis. From the infrared analysis the amount of diborane converted, the amount of petaborane (9) and pentaborane (11) and tetraborane produced were calculated.

After evacuation of the volatile materials from the reactor, only decaborane and yellow boron polymers remained. The bulb was then disconnected from the manifold and the inside washed as thoroughly as possible with a small amount (approximately 20 ml.) of methylcyclohexane. The decaborane, being quite soluble in this solvent, was extracted while the yellow boron polymer film remained. The decaborane solution was submitted for infrared analysis and the yield of decaborane was determined therefrom. Solid decaborane can be recovered from this solution by cooling to precipitate decaborane or by evaporating the solvent.

In this experiment 48.1 percent of the diborane was converted. The yield of tetraborane was 5.5 percent, pentaborane (9) 31.9 percent and decaborane 51.6 percent. No pentaborane (11) was formed under the conditions of this experiment.

Example II

This example was performed in the same apparatus and in the same manner as Example I. However, in this experiment approximately 20 mol percent of dimethylether, based on moles of diborane, was used instead of the 10 mole percent used in the previous example, and this example was also performed for 20 minutes rather than for 10 minutes as was the case in Example I.

The apparatus was fully evacuated, filled with dimethylether until the absolute pressure was 97 mm. of mercury and then with diborane until the absolute pressure was 537 mm. of mercury. Tap water was then passed through the condenser and the reactor was immersed in the hot oil bath maintained at 150° C. for a period of 20 minutes. The volatile materials and solid reaction products were recovered and analyzed in the same manner as in Example I. The conversion of diborane was 64.5 percent. The yield of decaborane was 48.4 percent, pentaborane (9) 46.4 percent, tetraborane 2.0 percent. No pentaborane (11) was produced.

*Example III*

This reaction was carried out in the same manner and in the same apparatus as Example I. However, pentaborane (9) was added as a reactant in addition to the diborane and dimethylether.

The apparatus was fully evacuated and then filled with pentaborane (9), dimethylether and diborane in amounts corresponding to vapor pressures of 50, 97 and 398 mm. of mercury, respectively.

The water was passed through the condenser and the reactor was immersed in an oil bath maintained at 150° C. for a period of 20 minutes. The quantities of reactants were such that at the temperature of the oil bath (150° C.) the expanded vapors exerted approximately one atmosphere of pressure. During the progress of the reaction, the decaborane collected in the neck of the bulb while the pressure rose to somewhat less than 2 atmospheres. At the end of the heating period the reactor was removed from the oil bath and quickly cooled by spraying with acetone. At this point the decaborane was almost entirely deposited within the neck of the bulb and a thin film of yellow boron polymers was evident on the bottom surface of the reactor.

The volatile materials in the flask were then transferred under vacuum and condensed into the trap connected to the vacuum line. The condensate was fractionally condensed from the main trap into three portions; the first condensing in a —78° C. trap, the second in a —130° C. trap and the third in a —196° C. trap. The combined fraction from the —78° C. trap and the —130° C. trap was allowed to expand into a known volume and the pressure noted. The fraction in the —196° C. trap was likewise permitted to expand into a known volume and the pressure noted. Gas samples from each of the expanded fractions were submitted for infrared analysis. From the infrared analysis the amount of diborane converted and the amount of tetraborane, pentaborane (9), and pentaborane (11) produced were determined.

After evacuation of the volatile materials from the reactor, only decaborane and yellow boron polymers remained. The bulb was disconnected from the manifold and the inside washed as thoroughly as possible with a small amount (approximately 20 ml.) of methylcyclohexane. The decaborane, being quite soluble in this solvent, was extracted while the yellow boron polymer film remained. The decaborane solution was submitted for infrared analysis. The yield of decaborane was determined therefrom.

In this experiment 65.4 percent of the diborane was converted. Although more pentaborane (9) was recovered than was initially introduced, calculations were made on the assumption that no pentaborane (9) was converted, although this may be incorrect from the standpoint of the mechanism of the reaction. Apparently a 16.7 percent yield of pentaborane (9) was derived from the converted diborane above the quantity initially introduced. In addition, there was 1.6 percent tetraborane. The yield of decaborane was 70.5 percent. No pentaborane (11) was formed under the conditions of this reaction. It can be seen in comparison of this example with Examples I and II that the yield of decaborane has increased from approximately 50 precent to 70 percent with the presence of 10 mole percent of pentaborane (9) at the beginning of the reaction.

*Example IV*

This experiment was performed in the same manner and in the same apparatus as Example I.

The apparatus was fully evacuated and then filled with carbon monoxide and diborane in amounts corresponding to vapor pressures of 98 and 436 mm. of mercury, respectively. Water was then passed through the condenser and the reactor was immersed in an oil bath at 150° C. for a period of 20 minutes. At the end of the heating period the reactor was removed from the hot oil bath and quickly cooled by spraying with acetone. The products were collected and analyzed in the same manner as in Example I. In this experiment 63.5 percent of the diborane was converted. The yield of tetraborane was 2.5 percent, pentaborane (9) 19 percent, and decaborane 46.5 percent.

Other dialkyl ethers besides dimethylether can be used as the Lewis base, generally lower dialkyl ethers containing from one to five carbon atoms in each alkyl radical, such as methyl ethyl ether, diethyl ether, methyl isopropyl ether, di-n-propyl ether and the like. Other Lewis bases that can be used are lower trialkyl phosphines and lower trialkyl arsines such as trimethylarsine and trimethylphosphine, dimethylberyllium, trimethyleneoxide and tertiaryamines. The concentration of the Lewis base will generally be from 5 mole percent to 50 mole percent, based on the moles of diborane. The reaction is generally carried out at a temperature of 100° C. to 200° C. and the time can be varied widely, generally from 10 minutes or less to one hour or more. The pyrolysis of the diborane to decaborane in the presence of the Lewis base can be performed with or without the presence of pentaborane (9). However, the presence of pentaborane (9) increases the yield of decaborane as shown in Example III and reduces the formation of pentaborane (9).

It is claimed:

1. A method for the preparation of decaborane which comprises pyrolyzing diborane at a temperature within the approximate range 100° C. to 200° C. while the diborane is in admixture with from 5 mole percent to 50 mole percent, based on the moles of diborane of dimethyl ether and recovering decaborane from the pyrolysis products.

2. The method of claim 1 wherein the diborane is pyrolyzed while in admixture with from 5 to about 25 mole percent of pentaborane (9), based upon the moles of diborane.

References Cited in the file of this patent

Walters et al.: Report No. MSA–9973–FR "The preparation of Pentaborane and the Evaluation of the Hazards of Handling Diborane and Pentaborane," written by W. H. Schechter, December 1, 1950, Mine Safety Appliances Co., Callery, Pa. Declassified May 11, 1954. Pages 1–7.

Stock: "Hydrides of Boron and Silicon," pages 54, 60, 80, 88, Cornell Univ. Press, Ithaca, N.Y. (1933). (Copy in Sci. Lib.)

Schechter et al.: "Boron Hydrides and Related Compounds," January 8, 1951, pages 25–27, declassified January 5, 1954, Dept. of the Navy, Bureau of Aeronautics. (Copy in Sci. Lib.)